(12) United States Patent
Takaai

(10) Patent No.: US 10,860,948 B2
(45) Date of Patent: Dec. 8, 2020

(54) EXTENDING QUESTION TRAINING DATA USING WORD REPLACEMENT

(71) Applicant: FUJI XEROX CO., LTD., Tokyo (JP)

(72) Inventor: Motoyuki Takaai, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 990 days.

(21) Appl. No.: 15/016,809

(22) Filed: Feb. 5, 2016

(65) Prior Publication Data

US 2017/0046625 A1 Feb. 16, 2017

(30) Foreign Application Priority Data

Aug. 14, 2015 (JP) .................................. 2015-160094

(51) Int. Cl.
*G06N 20/00* (2019.01)
*G06N 5/02* (2006.01)
*G06F 16/332* (2019.01)

(52) U.S. Cl.
CPC .......... *G06N 20/00* (2019.01); *G06F 16/3329* (2019.01); *G06N 5/022* (2013.01)

(58) Field of Classification Search
CPC ...... G06N 99/005; G06N 5/025; G06N 7/005; G06N 20/00; G06K 9/6256; G06K 9/6269
USPC .......................................................... 706/12
See application file for complete search history.

(56) References Cited

U.S. PATENT DOCUMENTS

| | | | |
|---|---|---|---|
| 7,092,888 B1* | 8/2006 | McCarthy | G10L 15/063 379/88.01 |
| 7,269,545 B2* | 9/2007 | Agichtein | G06F 17/2705 704/1 |
| 7,461,047 B2* | 12/2008 | Masuichi | G06F 17/2785 706/62 |
| 7,680,659 B2* | 3/2010 | Gao | G10L 15/063 704/10 |
| 8,694,453 B2* | 4/2014 | Kitamura | G06F 16/367 706/45 |
| 2005/0033711 A1* | 2/2005 | Horvitz | G06F 16/3346 706/50 |
| 2006/0277033 A1* | 12/2006 | Gao | G10L 15/063 704/10 |
| 2010/0063948 A1* | 3/2010 | Virkar | G06N 99/005 706/12 |
| 2011/0289025 A1* | 11/2011 | Yan | G06N 5/025 706/12 |

(Continued)

FOREIGN PATENT DOCUMENTS

EP 2819031 A1 * 12/2014 ............... G06N 7/00
JP H07-93351 A 4/1995

(Continued)

OTHER PUBLICATIONS

Eldesoky et al. —"Tapping into the Power of Automatic Question Generation"—2014—https://www.researchgate.net/publication/267266010_Tapping_into_the_Power_of_Automatic_Question_Generation (Year: 2014).*

*Primary Examiner* — Viker A Lamardo
(74) *Attorney, Agent, or Firm* — Oliff PLC

(57) ABSTRACT

An information processing apparatus includes a selector and an extending unit. The selector selects a word in question training data corresponding to a topic. The extending unit extends the question training data by replacing the word selected by the selector in the question training data by a word in answer data corresponding to the topic.

8 Claims, 12 Drawing Sheets

(56) References Cited

U.S. PATENT DOCUMENTS

| | | | | |
|---|---|---|---|---|
| 2011/0301941 A1* | 12/2011 | De Vocht | G06F 17/2715 | 704/9 |
| 2012/0030157 A1* | 2/2012 | Tsuchida | G06F 17/278 | 706/20 |
| 2012/0101965 A1* | 4/2012 | Hennig | G06N 99/005 | 706/12 |
| 2014/0040181 A1* | 2/2014 | Kuznetsov | G06F 17/2755 | 706/55 |
| 2014/0222417 A1* | 8/2014 | Lu | G10L 15/063 | 704/9 |
| 2014/0280087 A1* | 9/2014 | Isensee | G06F 17/30477 | 707/723 |
| 2014/0307958 A1* | 10/2014 | Wang | G06K 9/6256 | 382/159 |
| 2015/0019211 A1* | 1/2015 | Simard | G06F 17/2785 | 704/10 |
| 2015/0026106 A1* | 1/2015 | Oh | G06F 17/3069 | 706/12 |
| 2015/0095017 A1* | 4/2015 | Mnih | G06N 3/0454 | 704/9 |
| 2015/0161230 A1* | 6/2015 | Alkov | G06F 17/30705 | 707/737 |
| 2015/0194149 A1* | 7/2015 | Faizakof | G10L 15/1815 | 704/257 |
| 2015/0261849 A1* | 9/2015 | Chu-Carroll | G06F 16/334 | 707/723 |
| 2016/0155067 A1* | 6/2016 | Dubnov | G06F 17/2785 | 706/12 |
| 2016/0163310 A1* | 6/2016 | Lee | G10L 15/16 | 704/232 |
| 2017/0039271 A1* | 2/2017 | Bishop | G06F 17/271 | |
| 2017/0039482 A1* | 2/2017 | Bishop | G06F 17/30424 | |

FOREIGN PATENT DOCUMENTS

| | | | |
|---|---|---|---|
| JP | 2003-006207 A | 1/2003 | |
| WO | WO-2013058835 A2 * | 4/2013 | G06F 16/90335 |

* cited by examiner

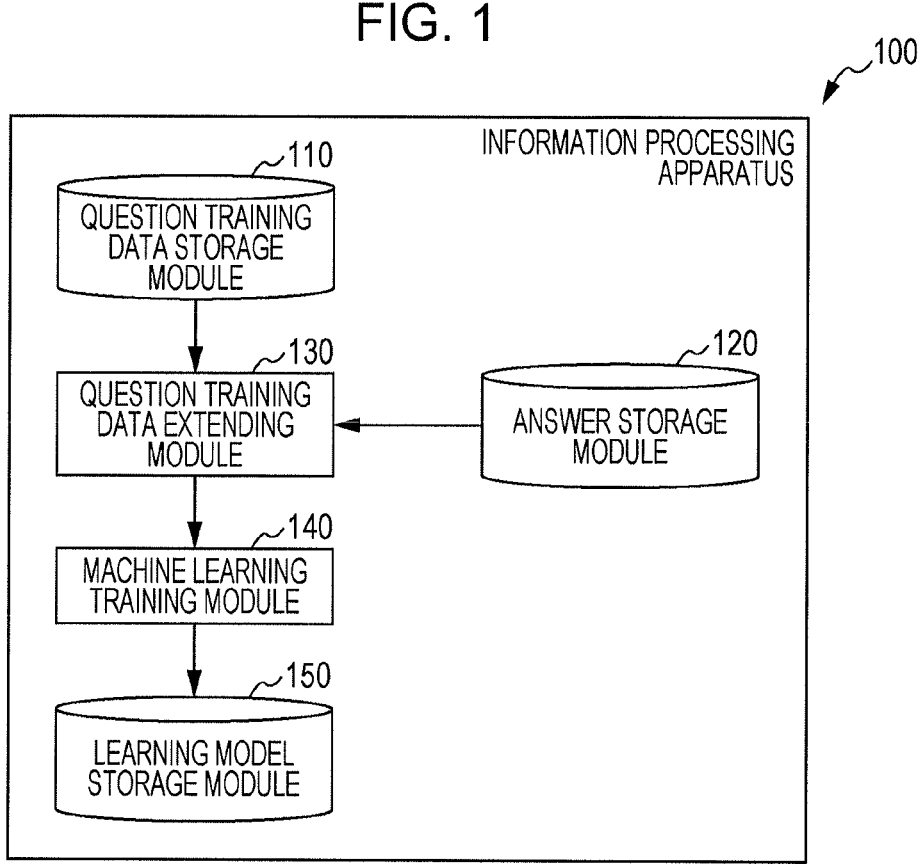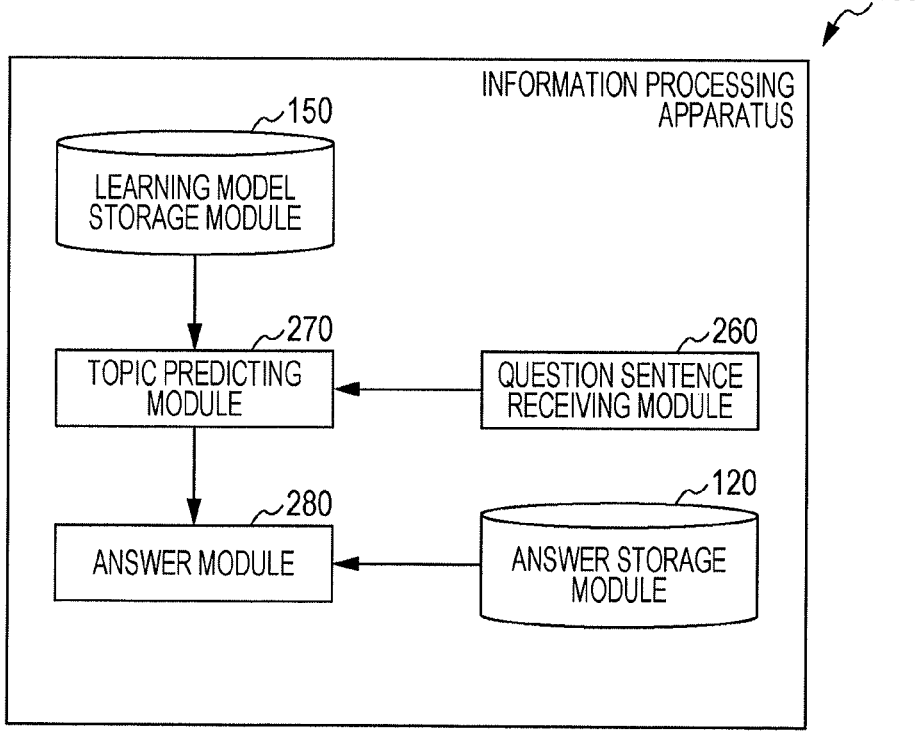

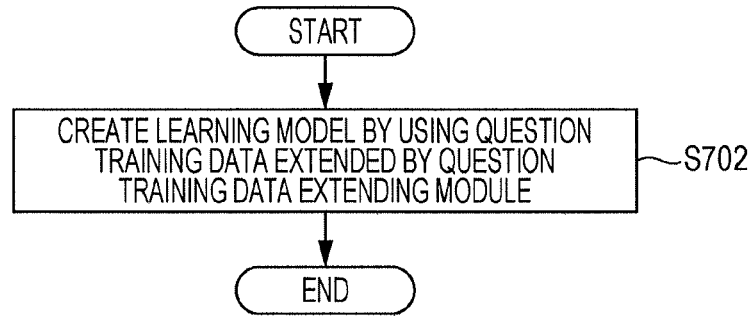
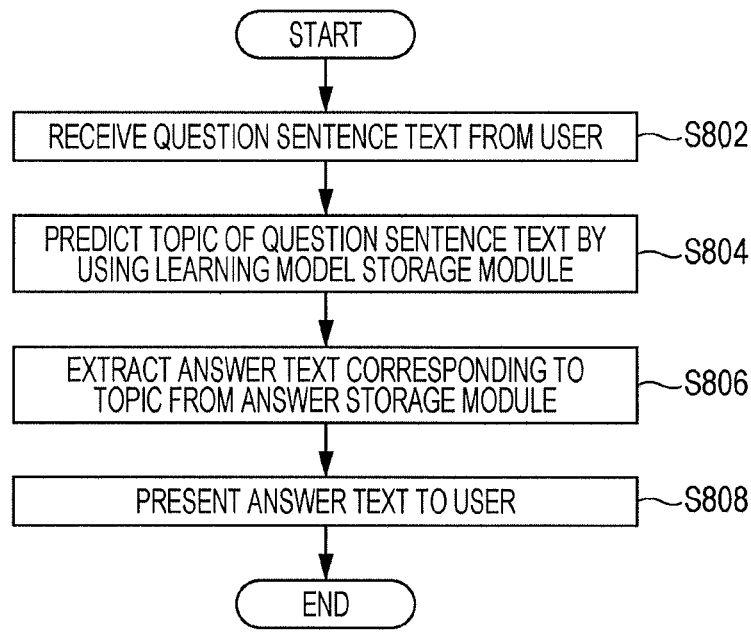

FIG. 10

| TOPIC ID | ANSWER TEXT |
|---|---|
| 1 | Our phone number is 01-234-5678. |
| 2 | Our website uses cookies. A cookie contains ··· |

FIG. 11

| QUESTION SENTENCE | TOPIC ID |
|---|---|
| Where is phone information? | 1 |
| Where is number information? | 1 |
| Where is 01-234-5678 information? | 1 |
| Where is contact phone? | 1 |
| Where is contact number? | 1 |
| Where is contact 01-234-5678? | 1 |

US 10,860,948 B2

EXTENDING QUESTION TRAINING DATA USING WORD REPLACEMENT

CROSS-REFERENCE TO RELATED APPLICATIONS

This application is based on and claims priority under 35 USC 119 from Japanese Patent Application No. 2015-160094 filed Aug. 14, 2015.

BACKGROUND

Technical Field

The present invention relates to an information processing apparatus and method and a non-transitory computer readable medium.

SUMMARY

According to an aspect of the invention, there is provided an information processing apparatus including a selector and an extending unit. The selector selects a word in question training data corresponding to a topic. The extending unit extends the question training data by replacing the word selected by the selector in the question training data by a word in answer data corresponding to the topic.

BRIEF DESCRIPTION OF THE DRAWINGS

Exemplary embodiments of the present invention will be described in detail based on the following figures, wherein:

FIG. 1 is a block diagram of conceptual modules forming an example of the configuration of a first exemplary embodiment;

FIG. 2 is a block diagram of conceptual modules forming another example of the configuration of the first exemplary embodiment;

FIG. 7 is a flowchart illustrating another example of processing executed by the first exemplary embodiment;

FIG. 8 is a flowchart illustrating another example of processing executed by the first exemplary embodiment;

FIG. 9 illustrates an example of the data structure of a question training data table;

FIG. 10 illustrates an example of the data structure of an answer text table;

FIG. 11 illustrates an example of the data structure of an extended question training data table;

DETAILED DESCRIPTION

Figure 3:
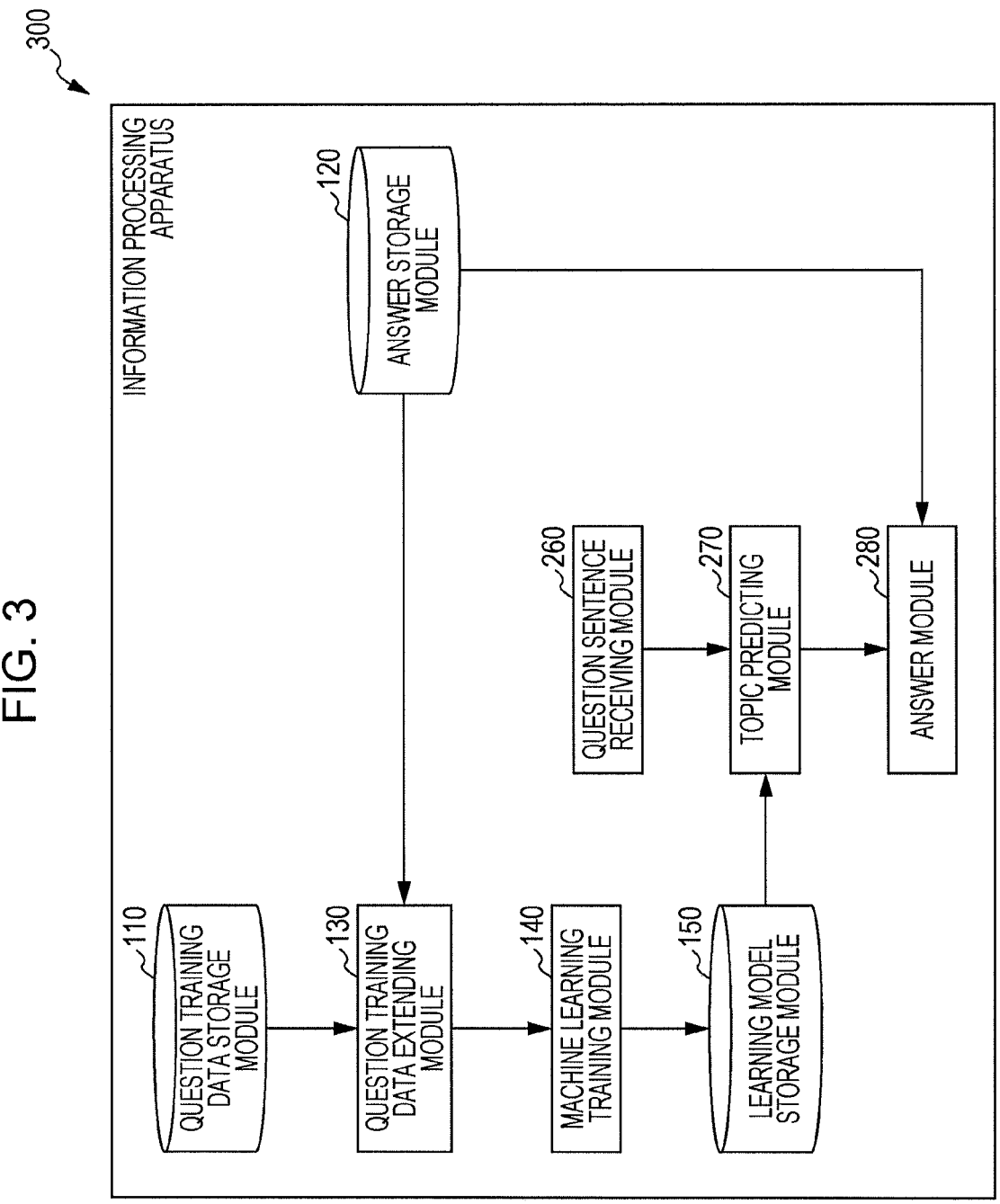
FIG. 3 is a block diagram of conceptual modules forming another example of the configuration of the first exemplary embodiment.

Exemplary embodiments of the present invention will be described below with reference to the accompanying drawings.

Before discussing the exemplary embodiments of the invention, the basis forming the exemplary embodiments and an information processing apparatus to which the exemplary embodiments are applicable will be discussed first. This description will be given for the purpose of easy understanding of the exemplary embodiments.

Question answering services are available in which questions about a certain product or service are received from users by email, telephone, or a web user interface, and answers to these questions are returned.

Generally, the staff of a special section, which is called a help desk or a call center, receives questions from users and answers these questions one by one. Nowadays, however, due to the need to decrease the personnel cost and the time to answer questions, there is a growing demand for computer-based automatic question answering.

In the related art, the following technology is available. A script knowledge base concerning tasks is prepared in advance. A question sentence is converted into a semantic representation by using a natural language analysis technique, and an answer sentence is output by associating the semantic representation with a script within the script knowledge base. According to this technology, if a certain question sentence is a sentence that can be semantically analyzed, an answer sentence corresponding to such a question sentence is output. On the other hand, however, dictionaries and grammars used for semantic analysis are necessary, and continuous maintenance for the dictionaries and grammars is required for handling new words.

In the related art, the following technology is also available. Pairs of questions and answers are prepared in advance, and a question that is most similar to a query from a user is searched for and a corresponding answer is returned. According to this technology, if many pairs of questions and answers are prepared, it is possible to handle various questions. Thus, continuous maintenance of dictionaries and grammars is not necessary. On the other hand, however, it is necessary to prepare many pairs of questions and answers.

That is, in a question answering system, it is necessary to prepare a large number of question sentences for enhancing the precision in predicting topics, and it is also necessary to relate each of the question sentences to a topic.

In the exemplary embodiments of the invention, a small number of question sentences are prepared and are each related to a topic. Then, one or multiple words in a question sentence are selected and are replaced by one or multiple words in an answer sentence corresponding to the topic related to the question sentence so as to create new question sentences. That is, a large number of question sentences are automatically generated by a combination of a selected word in a question sentence and a word in an answer sentence. In this case, "a small number of question sentences" means that the number of question sentences to be prepared is smaller than that which would be prepared for answering to queries with a level of precision equivalent to that in the related art. Note that question sentences to be used for generating learning models are those created by the exemplary embodiments of the invention.

First Exemplary Embodiment

FIG. 1 is a block diagram of conceptual modules forming an example of the configuration of a first exemplary embodiment (information processing apparatus 100).

Generally, modules are software (computer programs) components or hardware components that can be logically separated from one another. Accordingly, the modules of the exemplary embodiments of the invention are not only modules of a computer program, but also modules of a hardware configuration. Thus, the exemplary embodiments will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiments relate to a computer program, storing the computer program in a storage device or performing control so that the computer program is stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, etc.). The term "predetermined" means being determined prior to a certain operation, and includes the meaning of being determined prior to a certain operation before starting processing of the exemplary embodiments, and also includes the meaning of being determined prior to a certain operation even after starting processing of the exemplary embodiments, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary.

A system or an apparatus may be realized by connecting plural computers, hardware units, devices, etc., to one another via a communication medium, such as a network (including communication based on a one-to-one correspondence), or may be realized by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processed result is written into the storage device. Accordingly, a description of reading from the storage device before an operation or writing into the storage device after an operation may be omitted. Examples of the storage device may be a hard disk (HD), a random access memory (RAM), an external storage medium, a storage device using a communication line, a register within a central processing unit (CPU), etc.

An information processing apparatus 100 according to the first exemplary embodiment generates learning models to be used by a question answering system. As shown in FIG. 1, the information processing apparatus 100 includes a question training data storage module 110, an answer storage module 120, a question training data extending module 130, a machine learning training module 140, and a learning model storage module 150.

The question training data storage module 110 is connected to the question training data extending module 130. The question training data storage module 110 stores question training data corresponding to topics. For example, the question training data storage module 110 stores question training data (question text and question sentences) concerning questions that may be frequently asked by users. An identifier of a topic corresponding to each item of question training data is appended to the corresponding item of question training data. Question training data may be constituted by one sentence or plural sentences. More specifically, the question training data storage module 110 stores a question training data table 900. FIG. 9 illustrates an example of the data structure of the question training data table 900. The question training data table 900 includes a question sentence field 910 and a topic ID field 920. In the question sentence field 910, a question sentence is stored. In the topic ID field 920, information (topic identification (ID)) for uniquely identifying a topic in the exemplary embodiments is stored. The topic is a subject or a theme and refers to the content of a question indicated by question training data and the content of an answer indicated by answer data. Technically, the topic ID is an ID that associates question training data and answer data with each other. Accordingly, as the topic ID, an identifier for uniquely identifying answer data in the exemplary embodiments may be used. Multiple items of question training data may be associated with one item of answer data.

The answer storage module 120 is connected to the question training data extending module 130. The answer storage module 120 stores answer data corresponding to a topic. For example, the answer storage module 120 stores answer data (answer text and answer sentences) concerning answers to frequently asked questions according to the topic. Answer data is provided for each topic (topic identifier). Answer data may be constituted by one sentence or plural sentences. More specifically, the answer storage module 120 stores an answer text table 1000. FIG. 10 illustrates an example of the data structure of the answer text table 1000. The answer text table 1000 includes a topic ID field 1010 and an answer text field 1020. In the topic ID field 1010, a topic ID is stored. In the answer text field 1020, an answer text is stored. The content of the answer text may be a sentence in a chapter or a section of a manual.

The question training data extending module 130 is connected to the question training data storage module 110, the answer storage module 120, and the machine learning training module 140. The question training data extending module 130 extracts question training data corresponding to a certain topic from the question training data storage module 110 and selects words in the question training data.

The question training data extending module 130 then extracts answer data corresponding to the topic from the answer storage module 120 and replaces the selected words in the question training data by the associated words in the answer data, thereby extending the question training data.

The question training data extending module 130 may start processing when data within the question training data storage module 110 or the answer storage module 120 is updated. The question training data extending module 130 may start processing when a predetermined number or ratio of items of data within the question training data storage module 110 or the answer storage module 120 is updated. Alternatively, the question training data extending module 130 may start processing at predetermined regular intervals.

As more question sentences given from users are prepared in advance, the precision in predicting a topic by machine learning becomes higher. By using a given item of question training data and answer data for each topic, the question training data extending module 130 automatically generates pairs of items of question training data and identifiers of topics corresponding to the items of question training data. In this case, the number of generated items of question training data is greater than that of the given item of question training data. In this manner, the question training data extending module 130 extends the question training data.

The machine learning training module 140 is connected to the question training data extending module 130 and the learning model storage module 150. By using the question training data extended by the question training data extending module 130, the machine learning training module 140 generates learning models to be used for answering questions by performing machine learning.

The machine learning training module 140 is, for example, a training module of a supervised machine learning classifier. The machine learning training module 140 performs text analysis on question training data, and then performs training by setting the text analysis results as machine learning features and by regarding a topic identifier as a category. The learning results are output as learning models.

The learning model storage module 150 is connected to the machine learning training module 140. The learning model storage module 150 stores learning models generated by the machine learning training module 140.

FIG. 2 is a block diagram illustrating conceptual modules of an example of the configuration of the first exemplary embodiment (information processing apparatus 200). The information processing apparatus 200 is a question answering system for answering questions by using learning models generated by the information processing apparatus 100. As shown in FIG. 2, the information processing apparatus 200 includes an answer storage module 120, a learning model storage module 150, a question sentence receiving module 260, a topic predicting module 270, and an answer module 280.

The answer storage module 120 is connected to the answer module 280. The answer storage module 120 stores answer data corresponding to topics. More specifically, the answer storage module 120 stores the answer text table 1000. The same reference numeral is used for the answer storage module 120 shown in FIG. 2 and the answer storage module 120 of the information processing apparatus 100 shown in FIG. 1. However, the answer storage module 120 does not necessarily have to be physically the same storage device as the answer storage module 120 of the information processing apparatus 100 as long as it stores answer data used for generating learning models.

The learning model storage module 150 is connected to the topic predicting module 270. The learning model storage module 150 stores learning models generated by the information processing apparatus 100. The same reference numeral is used for the learning model storage module 150 shown in FIG. 2 and the learning model storage module 150 of the information processing apparatus 100 shown in FIG. 1. However, the learning model storage module 150 does not necessarily have to be physically the same storage device as the learning model storage module 150 of the information processing apparatus 100 as long as it stores learning models generated by the information processing apparatus 100.

The question sentence receiving module 260 is connected to the topic predicting module 270. The question sentence receiving module 260 receives a query text (question sentence text) when a query is made from a user. As a query from a user, a query text received by email or a web user interface or query voice obtained as a result of performing voice recognition on a query received by telephone may be used.

The topic predicting module 270 is connected to the learning model storage module 150 and the answer module 280. The topic predicting module 270 extracts answer data concerning an answer to a question by using learning models (learning models generated by the machine learning training module 140) stored in the learning model storage module 150. More specifically, the topic predicting module 270 performs text analysis on a question sentence text from a user and classifies the question sentence text by using learning models, which are learning results obtained by the machine learning training module 140. The classification result is related to the identifier of a topic.

The answer module 280 is connected to the answer storage module 120 and the topic predicting module 270. The answer module 280 presents answer data extracted by the topic predicting module 270 to a user who has made a query. More specifically, the answer module 280 obtains an answer text corresponding to the identifier of a topic predicted by the topic predicting module 270 from the answer module 120, and presents the answer text to the user. Presenting of an answer text to a user may be performed by displaying the answer text on a display device, such as a liquid crystal display, included in a personal computer (PC) used by a user made a query, by outputting the answer text as voice from a sound output device, such as a speaker, or by printing the answer text by using a printer.

FIG. 3 is a block diagram illustrating conceptual modules of an example of the configuration of the first exemplary embodiment (information processing apparatus 300).

The information processing apparatus 300 includes a question training data storage module 110, an answer storage module 120, a question training data extending module 130, a machine learning training module 140, a learning model storage module 150, a question sentence receiving module 260, a topic predicting module 270, and an answer module 280. The information processing apparatus 300 is a combination of the information processing apparatuses 100 and 200, and generates learning models and answers questions from users. The functions and processing operations of the modules of the information processing apparatus 300 are equivalent to those of the counterparts of the information processing apparatuses 100 and 200.

The question training data storage module 110 is connected to the question training data extending module 130. The answer storage module 120 is connected to the question training data extending module 130 and the answer module 280. The question training data extending module 130 is connected to the question training data storage module 110, the answer storage module 120, and the machine learning training module 140. The machine learning training module 140 is connected to the question training data extending module 130 and the learning model storage module 150. The learning model storage module 150 is connected to the machine learning training module 140 and the topic predicting module 270. The question sentence receiving module 260 is connected to the topic predicting module 270. The topic predicting module 270 is connected to the learning model storage module 150, the question sentence receiving module 260, and the answer module 280. The answer module 280 is connected to the answer storage module 120 and the topic predicting module 270.

Figure 4:
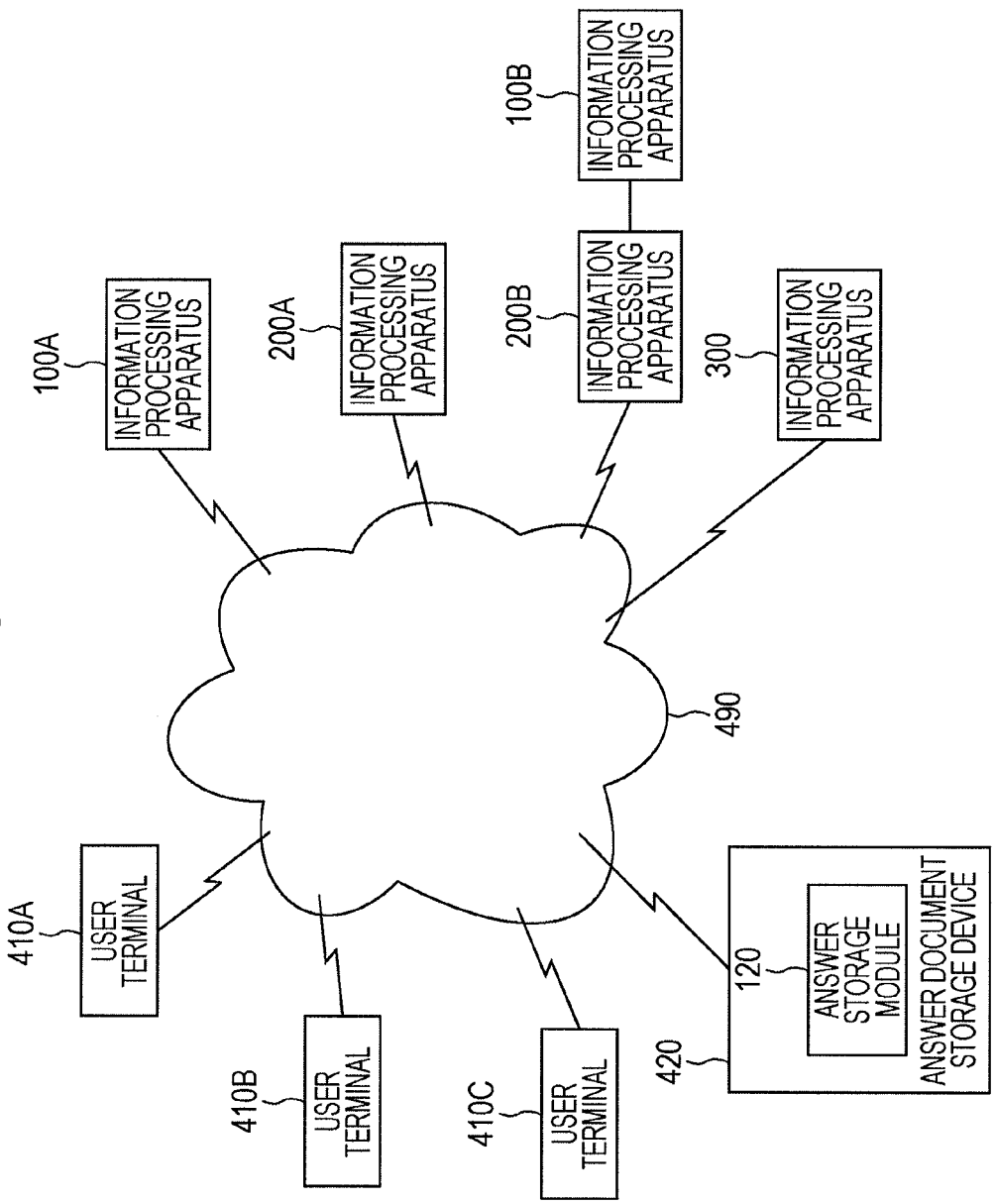
FIG. 4 illustrates an example of the configuration of a system using one of exemplary embodiments of the invention.

FIG. 4 illustrates an example of the configuration of a system using one of the exemplary embodiments.

Information processing apparatuses 100A, 200A, 200B, and 300, user terminals 410A, 410B, and 410C, an answer document storage device 420 are connected to one another via a communication network 490. Hereinafter, the user terminals 410A through 410C may be collectively referred to as the "user terminal 410" unless it is necessary to distinguish them from each other. The communication network 490 may be a wireless or wired medium, or a combination thereof, and may be, for example, the Internet or an intranet as a communication infrastructure. The functions of the information processing apparatuses 100A, 200A, 200B, and 300 may be implemented as cloud services.

The answer document storage device 420 includes an answer storage module 120.

The information processing apparatus 200B is connected to an information processing apparatus 100B.

The user terminal 410 sends a question to the information processing apparatus 200A, 200B, or 300 in accordance with a user operation, receives an answer therefrom, and presents the answer to the user. The user terminal 410 is a mobile terminal, such as a PC and a cellular phone (including a smartphone). A question sent by the user terminal 410 may be text data or voice data. The user terminal 410 may send question training data for generating learning models to the information processing apparatus 100A.

The information processing apparatus 100A obtains question training data from the user terminal 410 and generates learning models.

The information processing apparatus 200A obtains the learning models generated by the information processing apparatus 100A via the communication network 490.

The information processing apparatus 100B generates learning models in accordance with an instruction from, for example, an administrator. The information processing apparatus 200B obtains the learning models generated by the information processing apparatus 100B.

The information processing apparatus 300 obtains learning training data from the user terminal 410 and generates learning models.

As the answer storage module 120, the answer storage module 120 within the answer document storage device 420 connected to the communication network 490 may be used. The communication network 490 has a function as an online manual, for example.

In this case, the information processing apparatuses 100A, 100B, and 300 may generate learning models by using the answer storage module 120 connected via the communication network 490, and the information processing appara-tuses 200A, 200B, and 300 may create answers by using the answer storage module 120 connected via the communication network 490.

Figure 5:
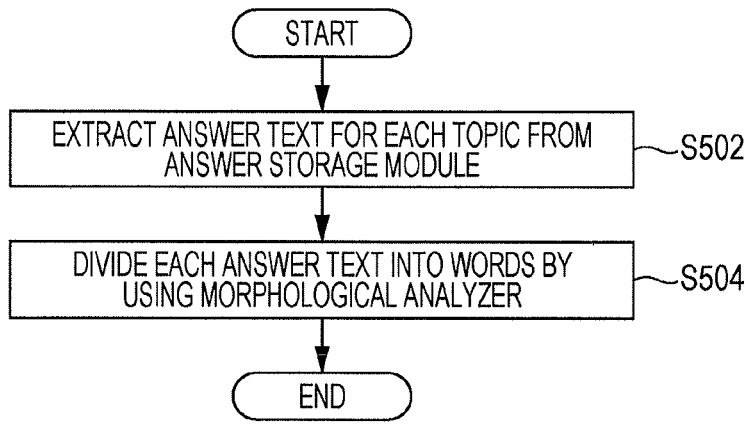
FIG. 5 is a flowchart illustrating an example of processing executed by the first exemplary embodiment.

FIG. 5 is a flowchart illustrating an example of processing executed by the first exemplary embodiment (question training data extending module 130).

In step S502, an answer text for each topic is extracted from the answer storage module 120.

In step S504, each answer text extracted in step S502 is divided into words by using, for example, a morphological analyzer. These words are used in step S610 in the flowchart of FIG. 6.

Figure 6:
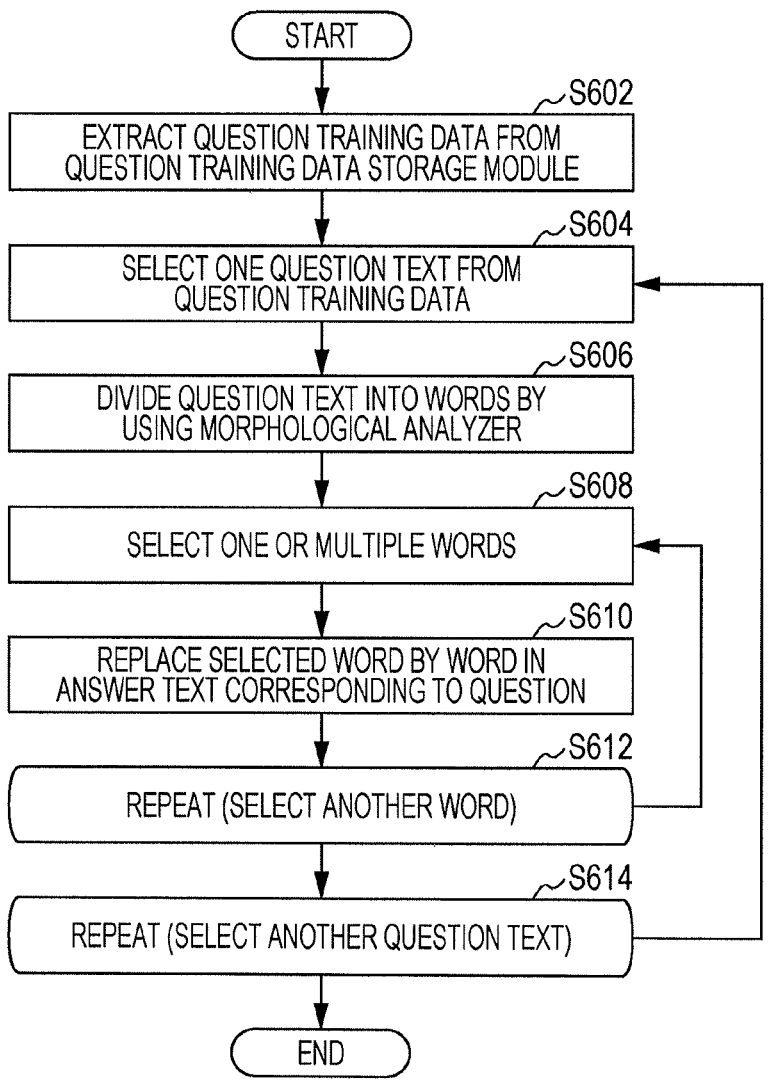
FIG. 6 is a flowchart illustrating another example of processing executed by the first exemplary embodiment.

FIG. 6 is a flowchart illustrating an example of processing executed by the first exemplary embodiment (question training data extending module 130).

In step S602, question training data is extracted from the question training data storage module 110.

In step S604, one question text is selected from the extracted question training data.

In step S606, the question text is divided into words by using, for example, a morphological analyzer.

In step S608, one or multiple words in the question text are selected.

In step S610, the selected word is replaced by the associated word in the answer text corresponding to the question described in the question text. In this case, the answer text corresponding to the question is the answer text having the same topic ID as the topic ID of the question training data. The word in the answer text is a word divided from the answer text in step S504 in the flowchart of FIG. 5.

In step S612, steps S608 and S610 are repeated by selecting another word until there is no word to be selected.

In step S614, steps S604 through S612 are repeated by selecting another question text until there is no question text to be selected.

FIG. 7 is a flowchart illustrating an example of processing executed by the first exemplary embodiment (machine learning training module 140).

In step S702, a learning model is created by using the question training data extended by the question training data extending module 130 (question training data created in the flowchart of FIG. 6).

FIG. 8 is a flowchart illustrating an example of processing executed by the first exemplary embodiment (information processing apparatus 200).

In step S802, the question sentence receiving module 260 receives a question sentence text from a user.

In step S804, the topic predicting module 270 predicts a topic of the question sentence text by using the learning model storage module 150.

In step S806, the answer module 280 extracts an answer text corresponding to the predicted topic from the answer storage module 120.

In step S808, the answer module 280 presents the answer text to the user.

An example of the operation of the first exemplary embodiment (information processing apparatus 100) will be described below by using sample data.

Each of the answer texts within the answer text table 1000 is divided into words in advance (see the flowchart of FIG. 5).

For example, as shown in the example of FIG. 10, the answer text of the topic ID1 is "Our|phone|number|is|01-234-5678|." (word delimiters are represented by "|").

Then, among these words, only characteristic words relevant to the question or the topic are selected. In this case, "Our", "is", "." are general words and are not selected, while "phone", "number", "01-234-5678" are selected. The text with the selected words underlined is as follows.

"Our|phone|number|is|01-234-5678|."

In this case, the characteristic words may be selected by using an approach based on the frequency of word appearance, such as term frequency—inverse document frequency (TF-iDF). Alternatively, a general word dictionary called a stop word list may be used, and words other than the words in the stop word list may be selected as the characteristic words. Alternatively, within the answer text table 1000, words other than the words for which the frequency of appearance is equal to or higher than a predetermined threshold may be selected as the characteristic words.

Similarly, the answer text of the topic ID2 within the answer text table 1000 is divided into words, and characteristic words are selected.

Then, the following processing is performed in accordance with the flowchart of FIG. 6.

One item of data is selected from items of question training data within the question training data table 900. Then, the question sentence of the selected data is divided into words, and characteristic words are selected. That is, the above-described processing performed on the answer text is also performed on the question training data.

For example, the first item of data within the question training data table 900 is "Where|is|contact|information|?".

Then, as a result of replacing the characteristic words in the question sentence by the characteristic words in the answer text, the following items of data are obtained. General words are words that are desirably left in the question sentence.

"Where|is|phone|information|?"
"Where|is|number|information|?"
"Where|is|01-234-5678|information|?"
"Where|is|contact|phone|?"
"Where|is|contact|number|?"
"Where|is|contact|01-234-5678|?"

The first three sentences are those obtained by replacing "contact" by the corresponding words, and the last three sentences are obtained by replacing "information" by the corresponding words.

In the above-described examples, only one word in the question sentence is replaced by a corresponding word in the answer text. However, a combination of plural words in the question sentence may be replaced by a corresponding combination of plural words in the answer text.

The divided words are interconnected to each other to form a sentence, and the corresponding topic ID is appended to the sentence. Then, items of data in an extended question training data table 1100, such as those shown in FIG. 11, are obtained. FIG. 11 illustrates an example of the data structure of the extended question training data table 1100. The extended question training data table 1100 includes a question sentence field 1110 and a topic ID field 1120, and has a data structure equivalent to that of the question training data table 900 shown in FIG. 9. In the question sentence field 1110, a question sentence is stored. In the topic ID field 1120, a topic ID is stored.

Similarly, new question sentences are generated for the other items of question training data within the question training data table 900, and are integrated with each other so as to generate items of question training data. In this manner, the number of items of question training data is increased.

Figure 12:
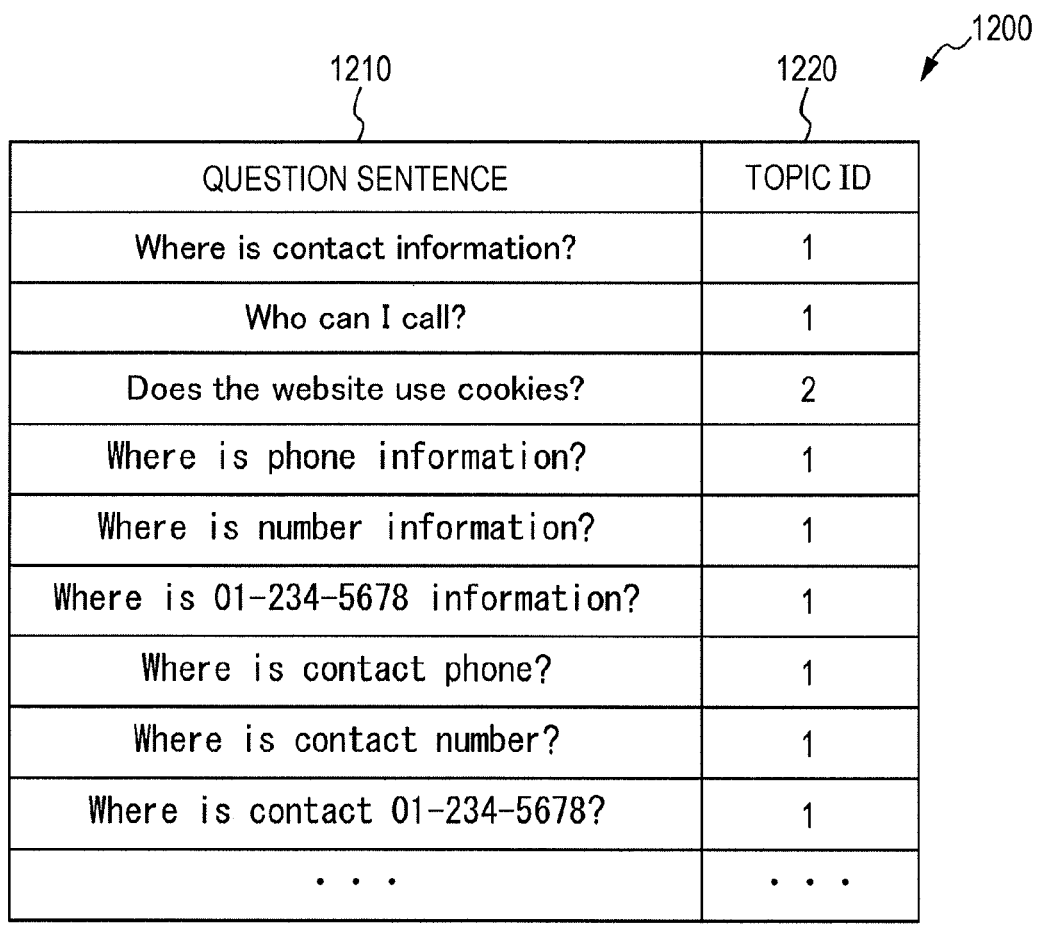
FIG. 12 illustrates an example of the data structure of a question training data (teacher data) table.

Items of teacher data used by the machine learning training module 140 are those in a question training data (teacher data) table 1200. FIG. 12 illustrates an example of the data structure of the question training data (teacher data) table 1200. The question training data (teacher data) table 1200 includes a question sentence field 1210 and a topic ID field 1220, and has a data structure equivalent to that of the question training data table 900 shown in FIG. 9. In the question sentence field 1210, a question sentence is stored. In the topic ID field 1220, a topic ID is stored. The question training data (teacher data) table 1200 is a table obtained by adding the extended question training data table 1100 to the question training data table 900.

Second Exemplary Embodiment

Figure 13:
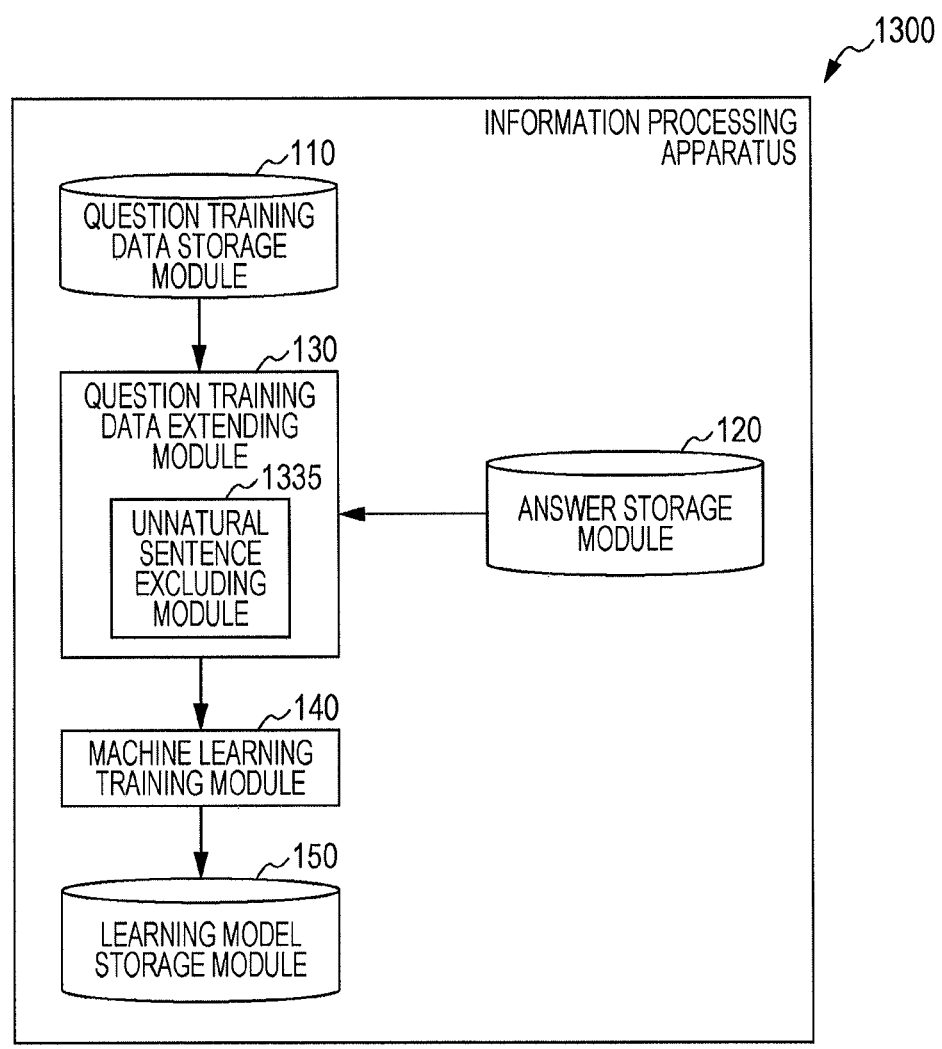
FIG. 13 is a block diagram of conceptual modules forming an example of the configuration of a second exemplary embodiment.

FIG. 13 is a block diagram of conceptual modules forming an example of the configuration of a second exemplary embodiment (information processing apparatus 1300). An information processing apparatus 1300 generates learning models to be used by a question answering system. As shown in FIG. 13, the information processing apparatus 1300 includes a question training data storage module 110, an answer storage module 120, a question training data extending module 130, a machine learning training module 140, and a learning model storage module 150. The information processing apparatus 1300 is an apparatus in which an unnatural sentence excluding module 1335 is included in the question training data extending module 130 of the information processing apparatus 100 shown in FIG. 1. The unnatural sentence excluding module 1335 may be included in the question training data extending module 130 of the information processing apparatus 300.

Elements similar to those of the first exemplary embodiment are designated by like reference numerals, and an explanation thereof will thus be omitted.

The unnatural sentence excluding module 1335 excludes unnatural sentences from question training data extended by the question training data extending module 130.

Unnatural question sentences are mixed in question sentences generated in the first exemplary embodiment. For example, among the above-described sentences of extended question training data, "Where is 01-234-5678 information?" is an example of unnatural question sentences. Accordingly, for excluding such unnatural question sentences, natural language processing is performed to verify the fluency of extended question training data. For example, by using a probabilistic language model represented by an N-Gram model, the existence probabilities of question sentences are calculated, and sentences only having a high probability value (value equal to or higher than a predetermined threshold) may be used as training data. Alternatively, sentences only accepted by a parser may be used as training data.

Unnatural question sentences may be excluded so that the number of unnatural question sentences will be equal to or smaller than a predetermined threshold A and equal to or greater than a predetermined threshold B. The reason for this is that learning models that may enhance the precision in predicting a topic may be generated if noise (unnatural question sentences) is included in teacher data.

Figure 14:
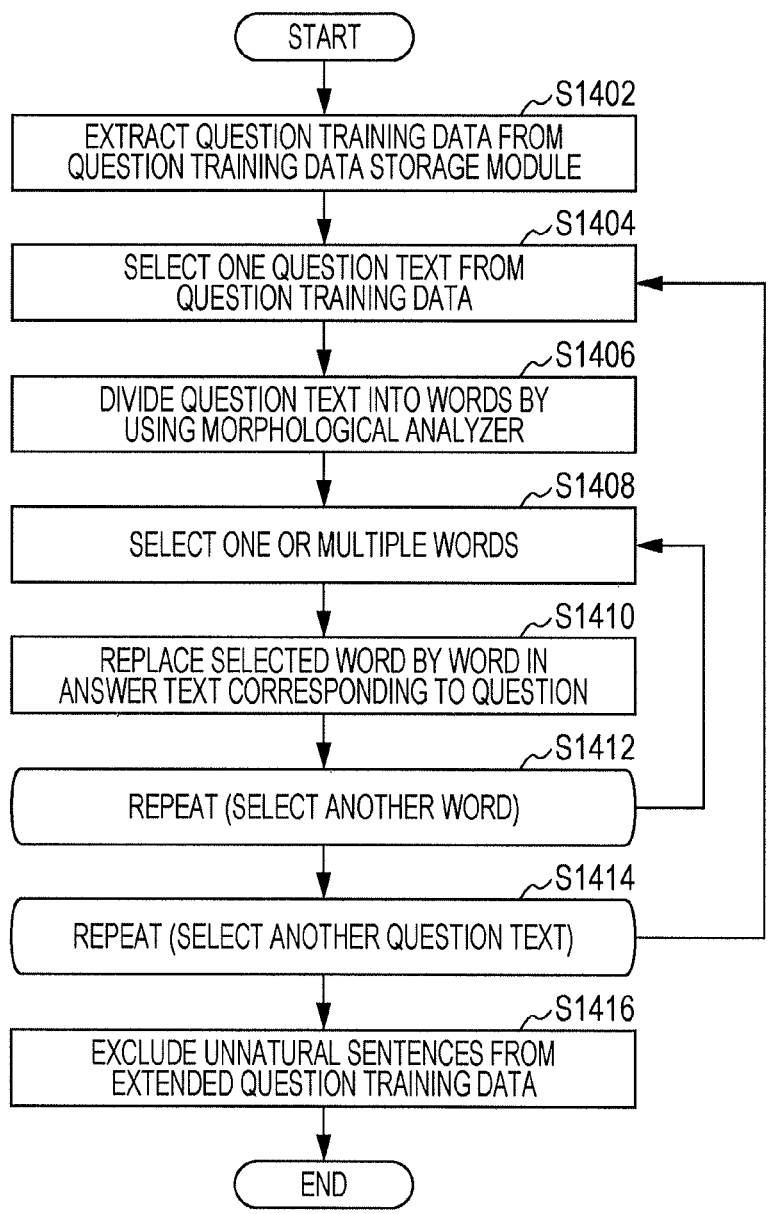
FIG. 14 is a flowchart illustrating an example of processing executed by the second exemplary embodiment.

FIG. 14 is a flowchart illustrating an example of processing executed by the second exemplary embodiment.

In step S1402, question training data is extracted from the question training data storage module 110.

In step S1404, one question text is selected from the extracted question training data.

In step S1406, the question text is divided into words by using, for example, a morphological analyzer.

In step S1408, one or multiple words in the question text are selected.

In step S1410, the selected word is replaced by the associated word in the answer text corresponding to the question described in the question text.

In step S1412, steps S1408 and S1410 are repeated by selecting another word until there is no word to be selected.

In step S1414, steps S1404 through S1412 are repeated by selecting another question text until there is no question text to be selected.

In step S1416, the unnatural sentence excluding module 1335 excludes unnatural sentences from the extended question training data.

Third Exemplary Embodiment

Figure 15:
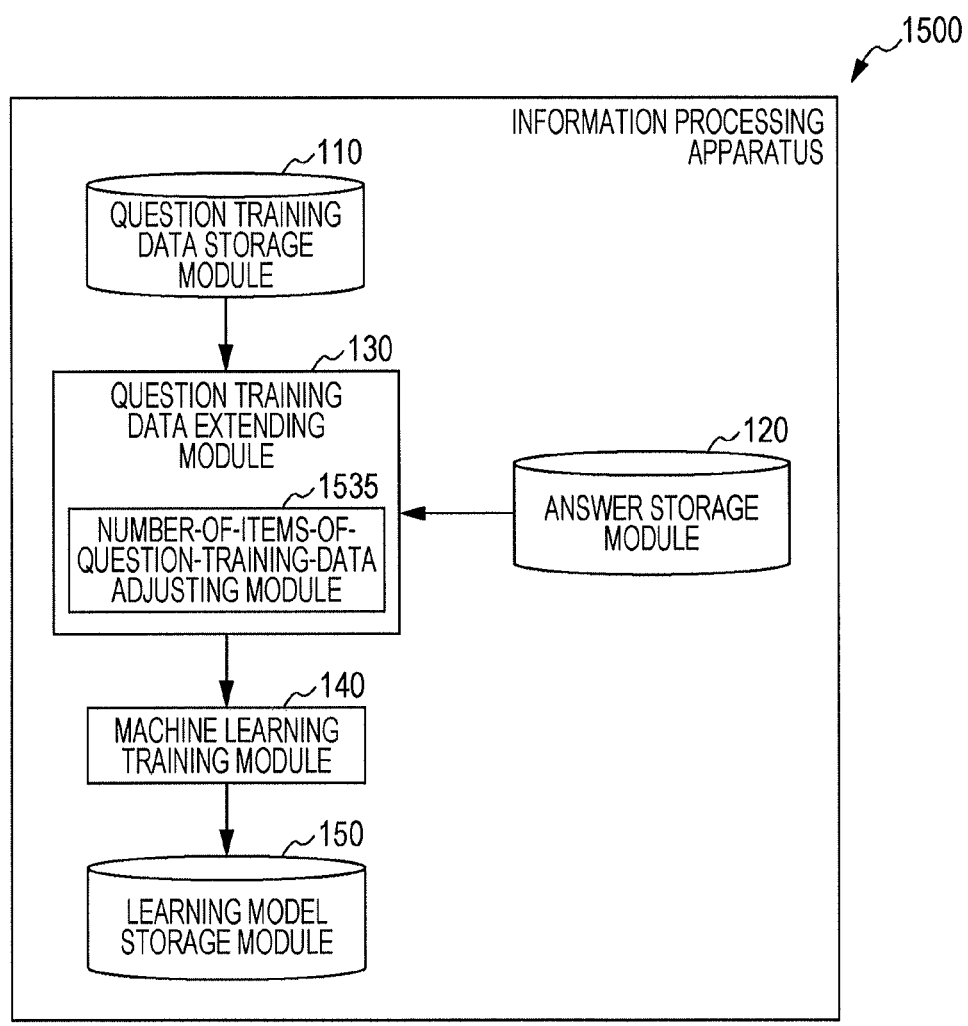
FIG. 15 is a block diagram of conceptual modules forming an example of the configuration of a third exemplary embodiment.

FIG. 15 is a block diagram of conceptual modules forming an example of the configuration of a third exemplary embodiment (information processing apparatus 1500). An information processing apparatus 1500 generates learning models to be used by a question answering system. As shown in FIG. 15, the information processing apparatus 1500 includes a question training data storage module 110, an answer storage module 120, a question training data extending module 130, a machine learning training module 140, and a learning model storage module 150. The information processing apparatus 1500 is an apparatus in which a number-of-items-of-question-training-data adjusting module 1535 is included in the question training data extending module 130 of the information processing apparatus 100 shown in FIG. 1. The number-of-items-of-question-training-data adjusting module 1535 may be included in the question training data extending module 130 of the information processing apparatus 300.

Elements similar to those of the first exemplary embodiment are designated by like reference numerals, and an explanation thereof will thus be omitted.

The number-of-items-of-question-training-data adjusting module 1535 adjusts the number of items of question training data extended by the question training data extending module 130 so that the difference in the number of items of question training data among topics will be equal to or smaller than a predetermined threshold.

In this case, as the question sentences to be excluded for adjusting the number of items of question training data, unnatural sentences specified in the second exemplary embodiments may preferentially be excluded.

Generally, concerning question sentences generated in the first exemplary embodiment, as there are more words in an answer text, more question sentences are likely to be generated. If the number of question sentences considerably differs among the topics, the question answering precision may be decreased. The reason for this is that, as there are more items of question training data for a certain topic, the possibility of this topic being predicted becomes higher. To put it extremely, there may be a case in which the same answer is returned to any questions.

Accordingly, the proportion of the number of questions among the topics is controlled. For implementing this, the number of items of question training data may be normalized by using a technique, such as random sampling. For example, the number of items of question training data may be reduced so that the number of items of question training data for one topic will be the same as that for another topic. In this case, as the items of question training data to be excluded, unnatural question sentences specified by the unnatural sentence excluding module 1335 may be excluded.

Figure 16:
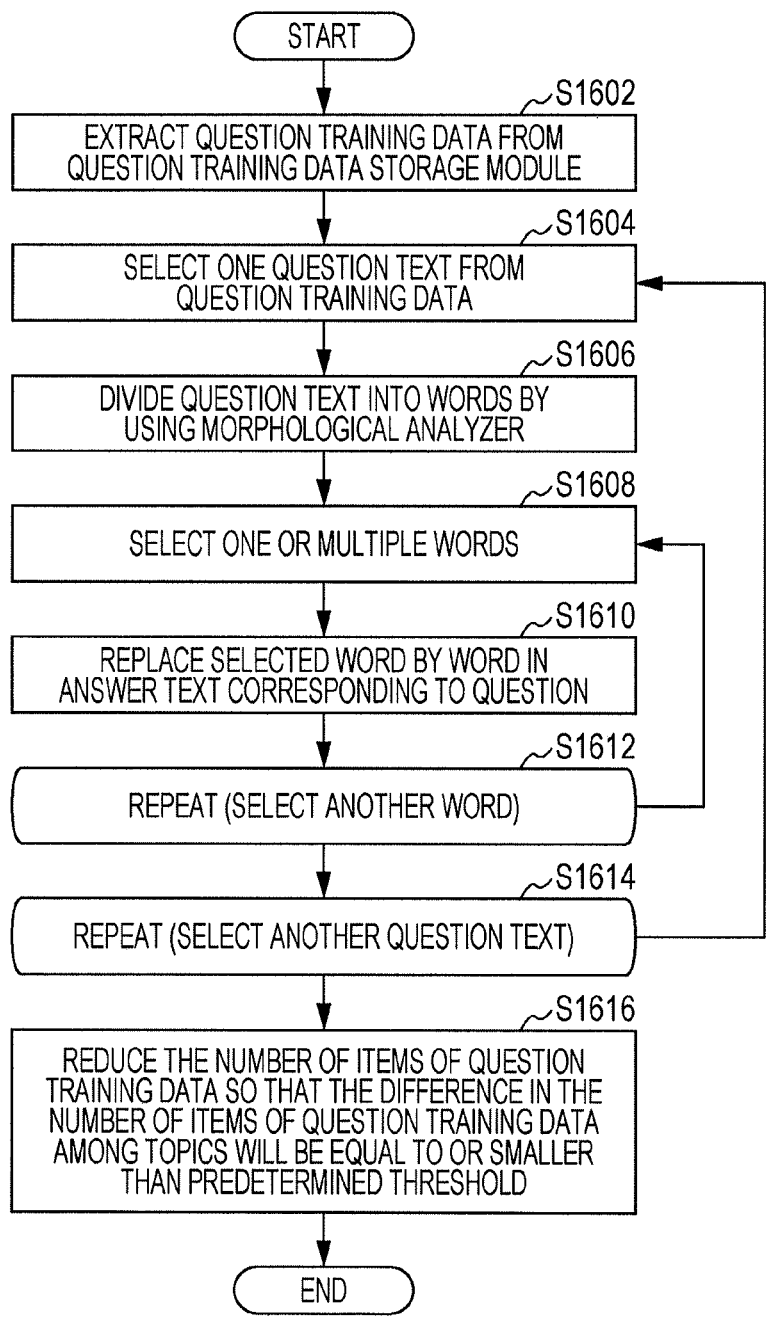
FIG. 16 is a flowchart illustrating an example of processing executed by the third exemplary embodiment.

FIG. 16 is a flowchart illustrating an example of processing executed by the third exemplary embodiment.

In step S1602, question training data is extracted from the question training data storage module 110.

In step S1604, one question text is selected from the extracted question training data.

In step S1606, the question text is divided into words by using, for example, a morphological analyzer.

In step S1608, one or multiple words in the question text are selected.

In step S1610, the selected word is replaced by the associated word in the answer text corresponding to the question described in the question text.

In step S1612, steps S1608 and S1610 are repeated by selecting another word until there is no word to be selected.

In step S1614, steps S1604 through S1612 are repeated by selecting another question text until there is no question text to be selected.

In step S1616, the number-of-items-of-question-training-data adjusting module 1535 adjusts the number of items of question training data so that the difference in the number of items of question training data among topics will be equal to or smaller than a predetermined threshold.

Figure 17:
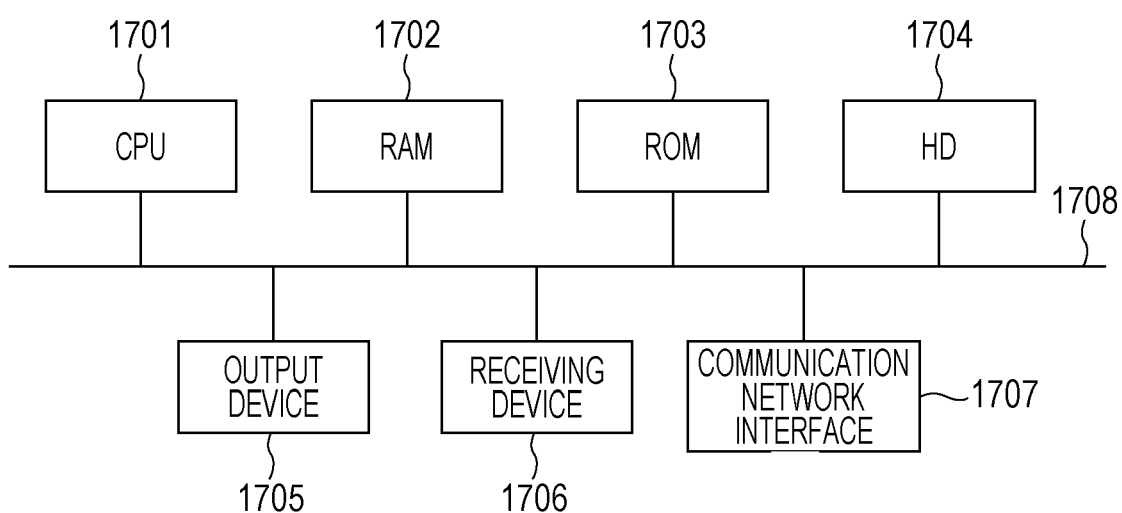
FIG. 17 is a block diagram illustrating an example of the hardware configuration of a computer implementing the exemplary embodiments of the invention.

The hardware configuration of a computer in which a program serving as the exemplary embodiments of the invention is executed is a general computer, such as a personal computer (PC) or a server, as shown in FIG. 17. More specifically, such a computer uses a CPU 1701 as a processor (operation unit) and a RAM 1702, a read only memory (ROM) 1703, and a hard disk (HD) 1704 as storage devices. As the HD 1704, a hard disk or a solid state drive (SSD) may be used. The computer includes the CPU 1701, the RAM 1702, the ROM 1703, the HD 1704, such as an auxiliary storage device (may alternatively be a flash memory), an output device 1705, such as a cathode ray tube (CRT), a liquid crystal display, and a speaker, a receiving device 1706, a communication network interface 1707, and a bus 1708. The CPU 1701 executes a program, such as the question training data extending module 130, the machine learning training module 140, the question sentence receiving module 260, the topic predicting module 270, the answer module 280, the unnatural sentence excluding module 1335, and the number-of-items-of-question-training-data adjusting module 1535. The RAM 1702 stores this program and data therein. The ROM 1703 stores a program for starting the computer. The HD 1704 has functions as the question training data storage module 110, the answer storage module 120, and the learning model storage module 150. The receiving device 1706 receives data on the basis of an operation performed by a user on a keyboard, a mouse, a touch panel, or a microphone. The communication network interface 1707 is, for example, a network interface card, for communicating with a communication network. The above-described elements are connected to one another via the bus 1708 and send and receive data to and from one another. The above-described computer may be connected to another computer configured similarly to this computer via a network.

In the above-described exemplary embodiments, concerning an element implemented by a computer program, such a computer program, which is software, is read into a system having the system configuration shown in FIG. 17, and the above-described exemplary embodiments are implemented in a cooperation of software and hardware resources.

The hardware configuration shown in FIG. 17 is only an example, and the exemplary embodiments may be configured in any manner as long as the modules described in the exemplary embodiments are executable. For example, some modules may be configured as dedicated hardware (for example, an application specific integrated circuit (ASIC)), or some modules may be installed in an external system and be connected to the PC via a communication line. Alternatively, a system, such as that shown in FIG. 17, may be connected to a system, such as that shown in FIG. 17, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, or a multifunction device (image processing apparatus including two or more functions among a scanner, a printer, a copying machine, and a fax machine).

The above-described exemplary embodiments may be combined (for example, a module of one of the exemplary embodiments may be added to another one of the exemplary embodiments, or may be replaced by a module of another one of the exemplary embodiments). As the processing content of the individual modules, a technique of the related art may be employed.

The above-described program may be stored in a recording medium and be provided. The program recorded on a recording medium may be provided via a communication medium. In this case, the above-described program may be implemented as a "non-transitory computer readable medium storing the program therein" in the exemplary embodiments of the invention.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray disc (registered trademark), a magneto-optical disk (MO), a flexible disk (FD), magnetic tape, a hard disk, a ROM, an electrically erasable programmable read only memory (EE-PROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be part of another program, or may be recorded, together with another program, on a recording medium. The program may be divided and recorded on plural recording media. Further, the program may be recorded in any form, for example, it may be compressed or encrypted, as long as it can be reconstructed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory storing:
      (i) question training data which includes a plurality of questions assigned to a topic, the topic being a subject or a theme of content included in a question, and
      (ii) answer data which includes an answer assigned to each topic; and
   a processor programmed to:
      receive a user-inputted query text;
      predict a topic relevant to the user-inputted query text by machine learning based on the question training data;
      extract, from the answer data, an answer that is assigned to the predicted topic; and
      enhance precision of the machine learning predicting a relevant topic for user-inputted texts by training the machine learning with extended question training data, wherein
   the processor is programmed to extend the question training data by:
      a) selecting a question assigned to a respective topic;
      b) selecting a word in the selected question;
      c) generating a new question by replacing the selected word in the selected question with a word that appears in a stored answer assigned to the respective topic; and
      d) repeating a)-c) for each of a plurality of questions assigned to the respective topic.

2. The information processing apparatus according to claim 1, wherein the processor is programmed to:
   present the extracted answer.

3. The information processing apparatus according to claim 1, wherein the processor is programmed to:
   in extending the question training data, after step d) exclude an unnatural sentence among new questions generated for the extended question training data.

4. The information processing apparatus according to claim 1, wherein the processor is programmed to:
   adjust a number of items of the question training data so that a difference in the number of items of the question training data among topics is equal to or smaller than a predetermined threshold.

5. The information processing apparatus according to claim 1, wherein
   the question training data is extended upon a determination that a predetermined number or ratio of items of the question training data or the answer data in the memory are updated.

6. The information processing apparatus according to claim 5, wherein
   the precision of the machine learning predicting a relevant topic for user-inputted texts is enhanced by training the machine learning with the extended question training data that have a greater number of questions than a number of questions included in the question training data.

7. An information processing method comprising:
storing (i) question training data which includes a plurality of questions assigned to a topic, the topic being a subject or a theme of content included in a question, and (ii) answer data which includes an answer assigned to each topic;
receiving a user-inputted query text;
predicting a topic relevant to the user-inputted query text by machine learning based on the question training data;
extracting, from the answer data, an answer that is assigned to the predicted topic; and
enhancing precision of the machine learning predicting a relevant topic for user-inputted texts by training the machine learning with extended question training data,
wherein the question training data is extended by:
   a) selecting a question assigned to a respective topic;
   b) selecting a word in the selected question;
   c) generating a new question by replacing the selected word in the selected question with a word that appears in a stored answer assigned to the respective topic; and
   d) repeating a)-c) for each of a plurality of questions assigned to the respective topic.

8. A non-transitory computer readable medium storing a program causing a computer to execute a process, the process comprising:
storing (i) question training data which includes a plurality of questions assigned to a topic, the topic being a subject or a theme of content included in a question, and (ii) answer data which includes an answer assigned to each topic;
receiving a user-inputted query text;
predicting a topic relevant to the user-inputted query text by machine learning based on the question training data;
extracting, from the answer data, an answer that is assigned to the predicted topic; and
enhancing precision of the machine learning predicting a relevant topic for user-inputted texts by training the machine learning with extended question training data,
wherein the question training data is extended by:
   a) selecting a question assigned to a respective topic;
   b) selecting a word in the selected question;
   c) generating a new question by replacing the selected word in the selected question with a word that appears in a stored answer assigned to the respective topic; and
   d) repeating a)-c) for each of a plurality of questions assigned to the respective topic.

* * * * *